A. H. HENKE.
AXLE OILER.
APPLICATION FILED JUNE 4, 1912.

1,084,433.  Patented Jan. 13, 1914.

Witnesses
Philip E. Barnes
Wm. J. Roerth

Inventor
August H. Henke
By Victor J. Evans
Attorney

UNITED STATES PATENT OFFICE.

AUGUST H. HENKE, OF CHICAGO, ILLINOIS.

AXLE-OILER.

1,084,433.   Specification of Letters Patent.   Patented Jan. 13, 1914.

Application filed June 4, 1912. Serial No. 701,545.

*To all whom it may concern:*

Be it known that I, AUGUST H. HENKE, a citizen of the United States, residing at Chicago, in the county of Cook and State of Illinois, have invented new and useful Improvements in Axle-Oilers, of which the following is a specification.

The present invention relates to improvements in oilers for vehicle axle skeins.

In carrying out my invention I propose to provide an oiler of simple construction embodying an axle having an oil receiving bore which communicates with annularly arranged delivery ports which intersect grooves arranged upon the outer face of the axle, the ports being provided with a loose packing of suitable porous material, so that the oil will not flow at too great a volume to the channels of the axle, the said axle being provided with a chambered nut which has its outer face provided with an oil inlet port and which is normally closed through the medium of a spring pressed cap which is movably sustained upon the nut.

I also aim to provide a device of this character having an oil saturated wick, with a chambered nut for the reception of a lubricant, the nut having a spring actuated presser member which is adapted to act upon the wick to prevent the oil or lubricant carried by the wick from reëntering the oil chamber of the nut.

I further propose to provide a device of this character which shall be absolutely dust proof, which at the same time affords simple and effective means whereby a lubricant may be fed through the axle and to the outer face thereof.

With the above recited objects in view, the invention resides in the novel construction, combination and arrangement of parts set forth in the following description and falling within the scope of the appended claim.

Figure 1:
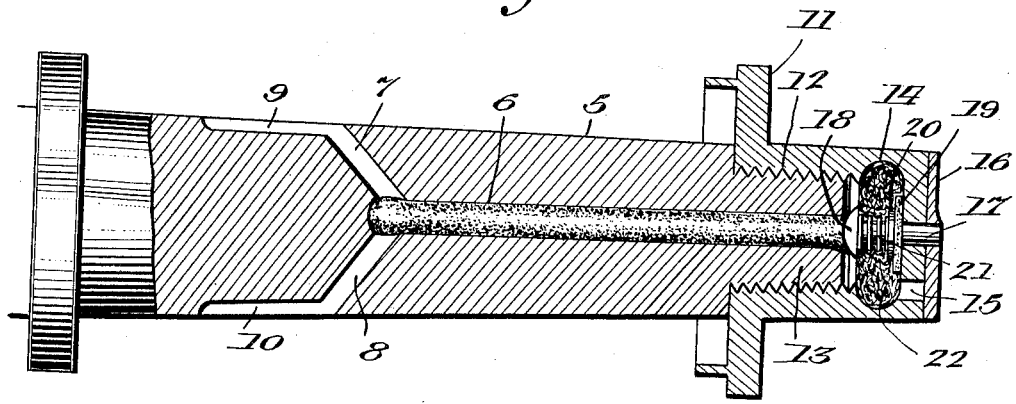
Figure 2:
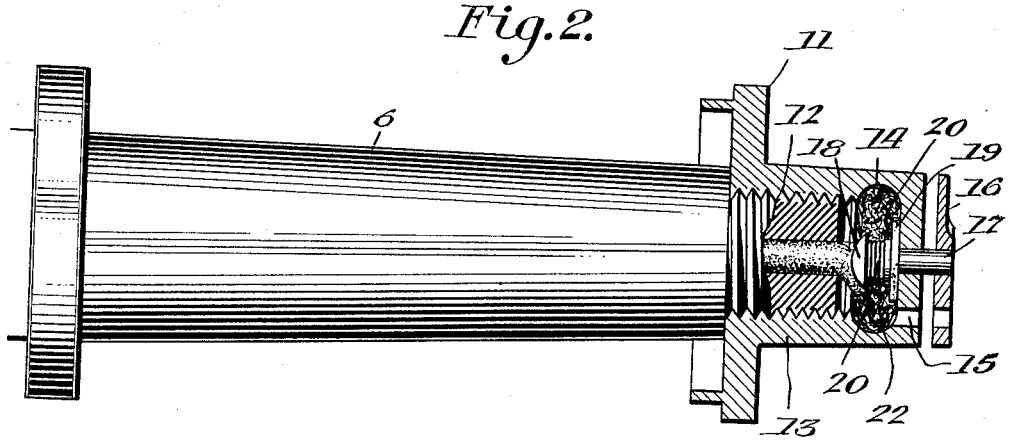
Figure 3:
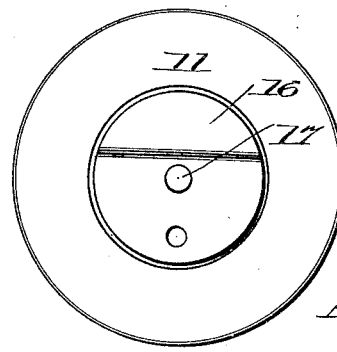

In the drawings, Figure 1 is a central longitudinal sectional view of an axle skein and nut therefor embodying my invention. Fig. 2 is a similar view illustrating the pressure member moved away from the oil delivery wick to permit of the insertion of oil to the chamber of the nut to be delivered to the wick. Fig. 3 is a front elevation of the nut.

Referring now to the drawing in detail the numeral 5 designates the axle skein and 6 the centrally arranged bore which extends from its reduced threaded portion to a suitable point away from its shoulder.

The numerals 7 and 8 designate angularly arranged ports which communicate with the terminal of the bore and which also intersect longitudinally arranged grooves 9 and 10 provided upon the outer face of the axle or skein 5.

The numeral 11 designates a carriage nut which has a threaded bore 12 which is adapted to coöperate with the reduced threaded extension 13 of the axle skein 5. The nut 11 is further provided with a chamber 14 for the reception of a lubricant, and the outer closed face of the nut is provided with a passage 15 the same being normally closed through the medium of a rotatable head or disk 16. This head 16 is connected with a stem 17 which extends through a central opening in the outer face of the nut, and which has its inner extremity provided with a head 18. Surrounding the stem 17 is a compressible washer 19 which is adapted to abut against the inner wall provided by the outer face of the nut, and by the chamber 14, and contacting with the said washer 19 is a metallic washer 20, the same being normally sustained against the washer 19 through the medium of a helical spring 21, which exerts a tension between the said washer 20 and the head 18 for the stem 17. The chamber 14 is preferably provided with a lubricant retaining substance such as the ordinary waste 22. The cover or disk 16 is provided with an aperture which when the disk or cover 16 is revolved upon the outer face of the nut is adapted to register with the passage 15 so that the spout of an oil can can be readily inserted to deliver oil to the chamber 14. The head 18 is arranged to contact with the wick which is arranged within the bore 6 of the axle skein 5, to compress the end of the said wick and to force the oil therefrom through the ports 7 and 8 to within the grooves 9. The head 18 does not entirely close the opening or bore 6, but merely compresses the wick against the outer face of the threaded portion of the skein so that a lubricant from the chamber 14 may at all times flow through the wick.

From the above description, taken in connection with the accompanying drawing, the simplicity of the device, as well as the advantages thereof will, it is thought commend themselves to those skilled in the art

Having thus described the invention, what I claim is:—

The herein described nut for axles which are provided with a central longitudinally disposed bore for the reception of a lubricant conveying wick which have their outer faces provided with grooves which intersect the bore, the said axle nut having its bore adjacent its outer closed face enlarged to provide an annular depressed lubricant chamber, a member arranged centrally within the chamber and extending through the face of the nut, the inner terminal of said member having formed integral therewith a head of greater diameter than the bore of the axle, washers upon the said nut, a spring upon the member and exerting a tension between the head of the member and the washers and forcing the head into engagement with one end of the lubricating wick and partially closing the inlet end of the bore, a rotatable disk secured to the extending portion of the member and adapted to ride against the outer face of the nut and to be forced into contact therewith by the spring of the member, the said member having an opening which when the said member is rotated upon the head member may be brought either into or out of register with the opening of the nut which communicates with the lubricant passage of the said nut.

In testimony whereof I affix my signature in presence of two witnesses.

AUGUST H. HENKE.

Witnesses:
 FRED C. NELSON,
 ALPHONSE C. HENKE.

Copies of this patent may be obtained for five cents each, by addressing the "Commissioner of Patents, Washington, D. C."